(12) United States Patent
Inenaga et al.

(10) Patent No.: US 6,243,187 B1
(45) Date of Patent: Jun. 5, 2001

(54) POLYGONAL MIRROR DEVICE

(75) Inventors: Hiroshi Inenaga; Junshin Sakamoto, both of Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/497,642

(22) Filed: Feb. 3, 2000

(30) Foreign Application Priority Data

Feb. 5, 1999 (JP) ................................................ 11-028269

(51) Int. Cl.$^7$ .................................................. G02B 26/08
(52) U.S. Cl. ............................ 359/200; 359/216; 310/51
(58) Field of Search .................................... 359/198, 199, 359/200, 216, 217, 218, 219; 310/40 R, 51, 262

(56) References Cited

U.S. PATENT DOCUMENTS 5,606,448 * 2/1997 Suzuki et al. ......................... 395/200
5,831,363 * 11/1998 Fukita et al. ............................ 310/91
5,910,693 * 6/1999 Park .................................. 310/67 R

* cited by examiner

*Primary Examiner*—Darren Schuberg
(74) *Attorney, Agent, or Firm*—Sughrue, Mion, Zinn, Macpeak & Seas, PLLC

(57) ABSTRACT

An annular groove is formed on the upper surface, or a surface C, of a rotor member. A surface D and a surface E of a rotor member, which are located closer to the center than the annular groove when radially viewed, are machined for correcting a dynamic unbalance of the rotor member. Therefore, a nonuniform deformation of the rotor member, which results from a centrifugal load and heat, which are due to the rotation of the rotor member, reaches the inside-diameter defining wall of the annular groove, but does not reach the outside-diameter defining wall of the annular groove since it is blocked by the annular groove.

11 Claims, 1 Drawing Sheet

POLYGONAL MIRROR DEVICE

BACKGROUND OF THE INVENTION

1. Field of the Invention

The present invention relates to a polygonal mirror device for an optical scanning used in an image forming apparatus for optically forming an image, such as a laser printer.

2. Description of the Related Art

FIG. 2 is a cross sectional view showing a conventional polygonal mirror device.

As shown, a polygonal mirror 1 is formed around an outer peripheral surface of a rotor member 2, and the rotor member 2 is rotatably fitted to a shaft 4, which is mounted to a housing 3a. A specific groove is formed on the shaft 4, to thereby form a hydrodynamic gas bearing which generates a dynamic pressure when the rotor member 2 rotates.

The rotor member 2 includes a motor magnet 5. A stator core 6, a coil 7 and a motor board 8 are mounted on the housing 3a to face the motor magnet 5. The coil 7 is magnetically excited to rotate the rotor member 2.

And a magnetic attraction force is generated between the motor magnet 5 and the stator core 6. At this time, the rotor member 2 poises at a position where the attraction force balances a weight of the rotor member 2. A dynamic unbalance of the rotor member is corrected by cutting a surface C and a surface D of the rotor member 2, such as a small drill, whereby generation of mechanical vibration of the rotor member 2 is suppressed to maintain a stable rotation of the rotor member 2. Holes 10 as cutting traces are left at specific positions on the surfaces C and D.

The rotor member 2 is covered with the housing 3a and a housing 3b as well, thereby preventing reflecting faces 1a of the polygonal mirror 1 from being soiled with dust and the like. A light beam goes into and out of the polygonal mirror device, through a window (not shown) formed in the housing 3b, in order to form a scan beam of light by the polygonal mirror 1.

As described above, the conventional art corrects the dynamic unbalance of the rotor member by cutting the surface C and the surface D of the rotor member 2 as correcting portions by means of a drill, whereby generation of its mechanical vibration is suppressed to maintain a stable rotation of the rotor member 2. Therefore, the holes 10 as cutting traces are left at specific positions on the surfaces C and D. Because of a centrifugal load generated by the rotation of the rotor member 2, the rotor member 2 is deformed in the radial direction. When the holes 10 are nonuniformly present on the rotor member 2, the rotor member 2 is also nonuniformly deformed in the radial direction. A height of the surface C is equal to that of the reflecting faces 1a of the polygonal mirror 1 measured from the same. Accordingly, the reflecting faces 1a of the polygonal mirror 1 formed on the outer peripheral surface of the rotor member 2 are also deformed nonuniformly, so that the reflecting faces 1a are strained by the centrifugal load. As a result, an accuracy of the light beam deflection for scanning is degraded, and when the polygonal mirror device is applied to, for example, a laser beam printer, this leads to a variation of a scanning angle by the rotation of the polygonal mirror device, and to deterioration of the print quality of the printer.

When the surface C is bored by the cutting means, the resultant hole 10 infrequently passes through the rotor member 2 and reaches the surface E located opposite to the surface C. When the through-hole reaches the surface E, the surface E is burred. The rotor member 2 is rotated at extremely high speed of 40,000 rpm. If the burr is left as it is, the burr is separated from the surface E by a centrifugal force, and will reach the reflecting faces 1a of the polygonal mirror 1, thereby possibly damaging the reflecting faces 1a. This brings about degradation of an accuracy of the light beam deflection for scanning. When it is applied to a laser beam printer, for example, a problem of deterioration of the print quality of the printer arises. To cope with this, it is necessary to remove the burr of the surface E by use of a reamer or a drill bit of which the diameter is larger than the diameter of the through-hole.

In the structure of the polygonal mirror device, the motor magnet 5, the stator core 6 and a ring portion (motor portion) including a coil are arrayed near the surface E. Accordingly, the surface E and its vicinal region are more complicated in configuration than the surface C and its vicinal region. This makes it difficult to remove the burr. For this reason, some of the burr remains on the surface E.

In FIG. 2, the diameter of the inner surface 11 of a portion of the rotor member 2, which is located near the surface E and to be abutted against the motor magnet 5, is larger than the inside diameter of the motor magnet 5. Therefore, when after the boring, the surface E and its vicinal region are cleaned by use of a compressed-air blowing machine, such as an air gun, part of cutting particles produced when the rotor member 2 is cut remains on the surface E and its vicinal region. If the burr and the cutting particles remaining on the surface E and its vicinal region are left, the burr and the cutting particles are separated from the surface E by a centrifugal force, and will reach the reflecting faces 1a of the polygonal mirror 1, thereby possibly damaging the reflecting faces 1a. This brings about degradation of an accuracy of the light beam deflection for scanning. When it is applied to a laser beam printer, for example, a problem of deterioration of the print quality of the printer arises.

Attempt to make it easy to remove the burr on the surface E will limit a freedom in designing the motor portion including the stator core 6 and the coil 7. Further, when the work of correcting the dynamic unbalance is done on the surface C, and successively it is done on the surface D, it is required to invert the rotor member 2 or to use a couple of opposed cutting means. As a result, the number of manufacturing steps or cost of related equipment is increased.

SUMMARY OF THE INVENTION

Accordingly, an object of the present invention is to provide a polygonal mirror which prevents the reflecting faces of the polygonal mirror from being strained by a centrifugal load applied thereto and heat thereof, makes it easy to remove burr and cutting particles, which are generated in the work of correcting a dynamic unbalance, and is excellent in a light-beam deflection for scanning accuracy, and further to provide a polygonal mirror device which reduces the number of manufacturing steps and cost of related equipment.

The present invention succeeds in solving the above problems in the following ways.

An annular groove is formed on the upper surface, or a surface C, of a rotor member. Execution of correcting means for correcting a dynamic unbalance of a rotor member is carried out at a portion closer to the center than an annular groove as radially viewed. When the portion closer to the center than an annular groove as radially viewed is cut by a cutting means, typically a small drill, the resultant hole 10 left in the rotor member is limited in location to the portion closer to the center than an annular groove as radially viewed. If a height of the potion where the hole 10 remains measured from the housing is equal to that of the reflecting faces of the polygonal mirror, as nonuniform deformation of the rotor member 2 in the radial direction, which is caused by the centrifugal load generated with the rotation of the rotor member 2, reaches the wall of an annular groove which defines its inside diameter, but it does not reach the wall thereof which defines its outside meter since it is interrupted by the annular groove. Therefore, even if the rotor member 2 is rotated and a centrifugal load acts on the rotor member, the reflecting faces 1a of the polygonal mirror are not strained.

Similarly, a nonuniform thermal expansion of the rotor member 2, which is caused by a temperature rise occurring by the rotation of the rotor member 2 will reach the inside-diameter defining wall surface of the annular groove, but it does not reach the outside-diameter defining wall surface. For this reason, no strain is created in the reflecting faces 1a of the polygonal mirror 1 even when the temperature of the rotor member 2 rises with its rotation.

In the present invention, correction of a dynamic unbalance of the rotor member is carried out on the surfaces E and D. In this case, when the rotor member is bored upward from the surface E by use of a small drill, for example, the bored hole 10 infrequently passes through the rotor member 2 and reaches the surface C. In this case, the surface C is burred. The surface C and its vicinal region define the upper surface of the polygonal mirror 1. The motor portion and the like are not present there. Accordingly, it is relatively simply configured. For this reason, burr removing work is easy.

In the present invention, the diameter of the inner surface 11 of a portion of the rotor member 2, which is located near the surface E and to be abutted against the motor magnet 5, is equal to the inside diameter of the motor magnet 5. Therefore, in cleaning, after the boring, the surface E and its vicinal region by use of a compressed-air blowing machine, such as an air gun, it is easy to remove cutting particles remaining on the surface E and its vicinal region. It is noted that the dynamic unbalance correction work is done near the surfaces on the same side as of the polygonal mirror 1, such as the surfaces E and D. Therefore, in the correction work, there is no need for inverting the rotor member 2 or using two cutting means oppositely disposed. In this respect, the number of manufacturing steps and cost of related equipment are reduced when comparing with the conventional correction work.

Therefore, the present invention provides a polygonal mirror which prevents the of the polygonal mirror from being strained by a centrifugal load applied thereto and heat thereof, makes it easy to remove burr and cutting particles, which are generated in the work of correcting a dynamic unbalance, and is excellent in a light-beam deflection for scanning accuracy.

DETAILED DESCRIPTION OF THE PRESENT INVENTION

The present invention will be described in detail with reference to FIG. 1.

Figure 1:
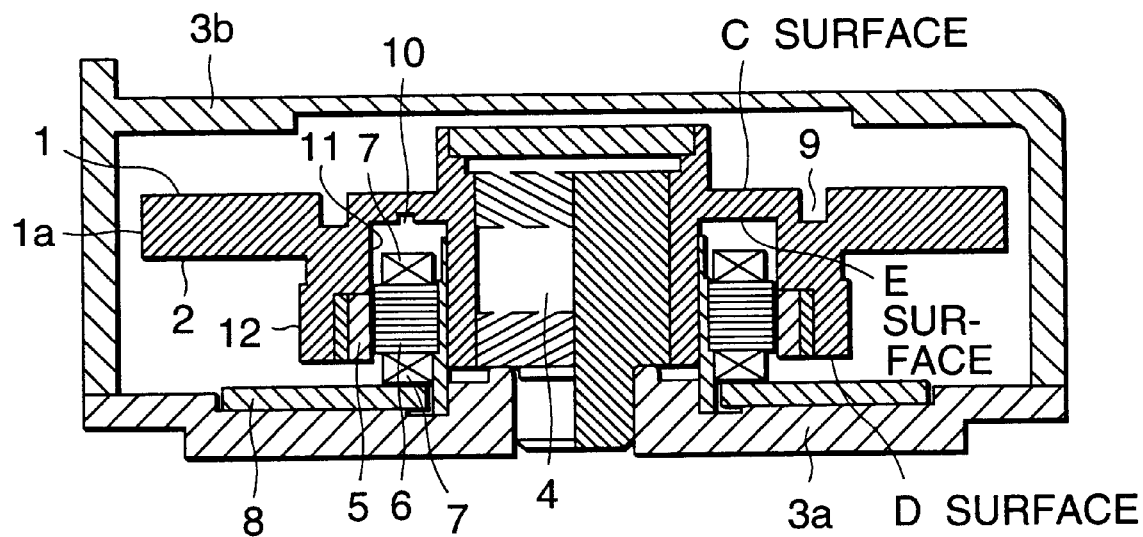
FIG. 1 is a cross sectional view showing a polygonal mirror device of an embodiment of the present invention.
Figure 2:
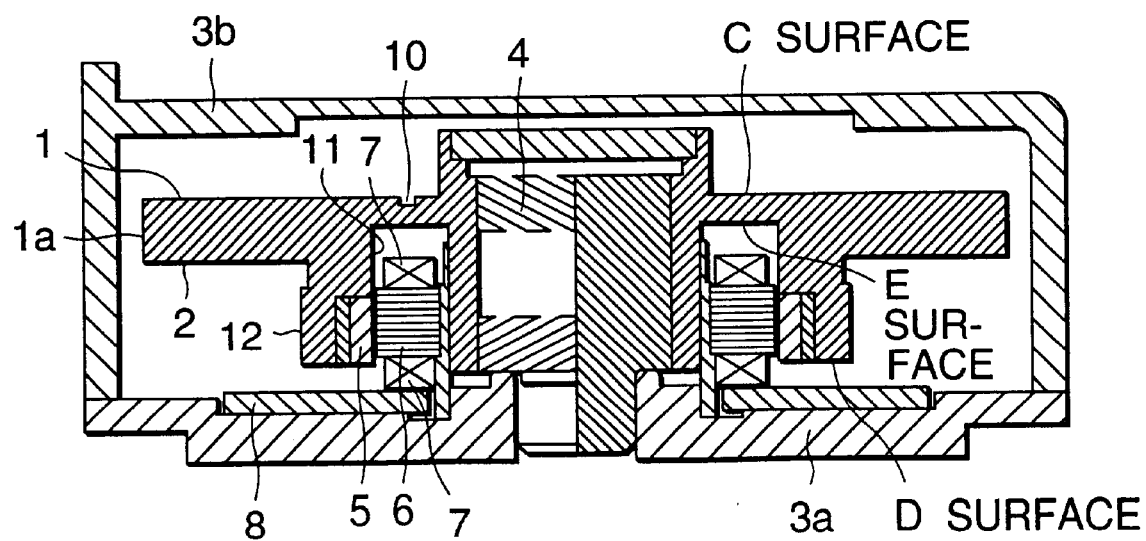
FIG. 2 is a cross sectional view showing a conventional polygonal mirror device.

In FIG. 1 showing an embodiment of the present invention, a polygonal mirror 1 is formed around the outer peripheral surface of a rotor member 2, and the rotor member 2 is rotatably fit to a shaft 4, which is mounted to a housing 3a. A specific groove is formed on the shaft 4, to thereby form a hydrodynamic gas bearing which generates a dynamic pressure when the rotor member 2 is rotated. A motor magnet 5 is provided on a ring portion 12 of the rotor member 2. A stator core 6, a coil 7 and a motor board 8 are mounted on the housing 3a to face the motor magnet 5. The coil 7 is magnetically excited to rotate the rotor member 2. And a magnetic attraction force is generated between the motor magnet 5 and the stator core 6. At this time, the rotor member 2 poises at a position where the attraction force balances a weight of the rotor member 2.

An annular groove 9 is formed in the upper surface of the rotor member 2, and A dynamic unbalance of the rotor member is corrected by cutting a surface E and a surface D, which are located closer to the center than the annular groove 9 as radially viewed, by means of a cutting means, such as a small drill, whereby generation of its mechanical vibration is suppressed to maintain a stable rotation of the rotor member 2. The rotor member 2 is covered with the housing 3a and another housing 3b as well, thereby preventing with reflecting faces 1a of the polygonal mirror 1 from being soiled with dust and the like.

A light beam goes into and out of the polygonal mirror device through a window (not shown) formed in the housing 3b, in order to form a scan beam of light by the polygonal mirror 1. When the surface E located closer to the center than the annular groove 9 as radially viewed, is bored by the cutting means, a hole 10 is left at a specific position on the surface E. The rotor member 2 is radially deformed by a centrifugal load generated by the rotation of the rotor member 2. When the hole 10 is nonuniformly present on the rotor member 2, the rotor member 2 is also nonuniformly deformed in the radial direction. A height of the surface E having the remaining hole 10 measured from the housing is equal to that of the reflecting faces 1a of the polygonal mirror 1 measured from the same. However, the nonuniform deformation of the rotor member 2 in the radial direction, which is caused by the centrifugal load generated with the rotation of the rotor member 2, reaches the wall of the annular groove 9 which defines its inside diameter, but it does not reach the wall thereof which defines its outside meter since it is interrupted by the annular groove 9. Therefore, even if the rotor member 2 is rotated and a centrifugal load acts on the rotor member, the reflecting faces 1a of the polygonal mirror 1 are not strained.

In the case of FIG. 1, the hole 10 is formed in the surface E, as shown. Also in a case where it is formed in a surface C of the rotor member, the annular groove 9 has like effect on the radial deformation of the rotor member. A depth of the annular groove 9, viz., a distance from the surface C to the bottom of the annular groove, is deeper or longer than a distance from the surface E to the bottom of the hole 10 formed therein or a distance from the surface C to the bottom of the hole formed therein, whereby the above effect is achieved. Incidentally, the above effect may be further enhanced by selecting the depth of the annular groove 9 to be longer than a distance between the surface C and the surface E.

A nonuniform thermal expansion of the rotor member 2, which is caused by a temperature rise occurring by the rotation of the rotor member 2 will reach the inside-diameter defining wall surface of the annular groove 9, but it does not reach the outside-diameter defining wall surface. For this reason, no strain is created in the reflecting faces 1a of the polygonal mirror 1 even when the temperature of the rotor member 2 rises with its rotation.

It is noted that the surface D is not close to the reflecting faces 1a of the polygonal mirror 1. Therefore, if the hole 10 remains in the reflecting faces 1a, there is no chance that the centrifugal load arising from the rotation of the rotor member 2 and the temperature of the rotor member affect the reflecting faces 1a of the polygonal mirror to stain the reflecting faces.

In the present invention, correction of a dynamic unbalance of the rotor member is carried out on the surfaces E and D. In this case, when the rotor member is bored upward from the surface E by sue of a small drill, for example, the bored hole 10 infrequently passes through the rotor member 2 and reaches the surface C. In this case, the surface C is burred. The surface E and its vicinal region define the upper surface of the polygonal mirror 1. The motor portion and the like are not present there. Accordingly, it is relatively simply configured. For this reason, burr removing work is easy. In a case where the bore passes through the surface C, the depth of the annular groove 9 is longer than the distance between the surface C and E.

In the present invention, the diameter of the inner surface 11 of a portion of the rotor member 2, which is located near the surface E and to be abutted against the motor magnet 5, is equal to the inside diameter of the motor magnet 5. Therefore, in cleaning, after the boring, the surface E and its vicinal region by use of a compressed-air blowing machine, such as an air gun, it is easy to remove cutting particles remaining on the surface E and its vicinal region.

It is noted that the dynamic unbalance correction work is done near the surfaces on the same side as of the polygonal mirror 1, such as the surfaces E and D. Therefore, in the correction work, there is no need of inverting the rotor member 2 or using two cutting means oppositely disposed. In this respect, the number of manufacturing steps and cost of related equipment are reduced when comparing with the conventional correction work.

Thus, the polygonal mirror device of the invention has the following advantageous effects. The reflecting faces of the polygonal mirror are not strained by the centrifugal load and heat. The work to remove burr and cutting power, which are produced in the dynamic unbalance correction work, is easy. An accuracy of light beam deflection for scanning is high. Further, the number of manufacturing steps and cost of related equipment are reduced in the dynamic unbalance correction work. Therefore, the resultant polygonal mirror device costs little.

As seen from the foregoing description, the invention provides a polygonal mirror device advantageous in that the reflecting faces of the polygonal mirror are not strained by the centrifugal load and heat, the work to remove burr and cutting power, which are produced in the dynamic unbalance correction work, is easy, and an accuracy of light beam deflection for scanning is high. Further, the polygonal mirror device of the invention cost little since the number of manufacturing steps and cost of related equipment are reduced in the dynamic unbalance correction work.

What is claimed is:

1. A polygonal mirror device comprising:
a polygonal mirror; and
a rotor member having the polygonal mirror;
wherein the rotor member has:
a correction portion defining a cut portion for correcting a dynamic unbalance of the rotor member; and
an annular groove which is coaxial with a center axis of the rotor member, the annular groove formed radially outside of the cut portion, the annular groove deeper in depth than the cut portion.

2. The polygonal mirror device as claimed in claim 1 comprising:
a motor magnet,
wherein the rotor member has a ring portion in which the motor magnet is disposed,
the annular groove is formed in an upper side of the ring portion of the rotor member.

3. A polygonal mirror device as claimed in claim 1,
wherein the correction portion defining the cut portion is equal or substantially equal in height to a reflecting face of the polygonal mirror.

4. A polygonal mirror device as claimed in claim 2,
wherein the correction portion defining the cut portion is equal or substantially equal in height to a reflecting face of the polygonal mirror.

5. The polygonal mirror device as claimed in claim 1,
wherein the correction portion includes at least two surfaces perpendicular to the center axis of the rotor member.

6. The polygonal mirror device as claimed in claim 5,
wherein the ring portion has an inner surface in a side of the center axis of the rotor member, the ring portion defines in the inner surface a hollow portion in which the motor magnet is disposed,
a distance from the center axis of the rotor member to the motor magnet is equal to or larger than a distance from the center axis of the rotor member to the inner surface.

7. A polygonal mirror device comprising:
a shaft,
a polygonal mirror,
a rotor member rotatably supported by the shaft, the rotor member having the polygonal mirror,
a ring portion protruded from the rotor member in a longitudinal direction of the shaft;
a motor magnet disposed in the ring portion;
wherein a cut portion is defined on the rotor member, an annular groove is defined on the rotor member which is coaxial with the shaft, the annular groove is formed radially outside of the cut portion, the annular groove is deeper in depth than the cut portion.

8. The polygonal mirror device as claimed in claim 7 comprising:
the annular groove is formed in an opposite side of the ring portion.

9. A polygonal mirror device as claimed in claim 7,
wherein a surface defining the cut portion is equal or substantially equal in height to a reflecting face of the polygonal mirror.

10. The polygonal mirror device as claimed in claim 7,
wherein the surface defining the cut portion includes at least two surfaces perpendicular to a longitudinal direction of the shaft.

11. The polygonal mirror device as claimed in claim 10,
wherein the ring portion has an inner surface in a side of a motor portion, the ring portion defines in the inner surface a hollow portion in which the motor magnet is disposed.
a distance from the shaft to the motor magnet is equal to or larger than a distance from the shaft to the inner surface.

* * * * *